US008703872B2

(12) United States Patent
Sauer

(10) Patent No.: US 8,703,872 B2
(45) Date of Patent: Apr. 22, 2014

(54) MULTIPLE FUNCTION GRAFT POLYMER

(75) Inventor: Richard P. Sauer, Somerset, NJ (US)

(73) Assignee: Castrol Limited (GB)

( * ) Notice: Subject to any disclaimer, the term of this patent is extended or adjusted under 35 U.S.C. 154(b) by 936 days.

(21) Appl. No.: 11/371,481

(22) Filed: Mar. 9, 2006

(65) Prior Publication Data
US 2006/0205611 A1 Sep. 14, 2006

Related U.S. Application Data

(60) Provisional application No. 60/661,205, filed on Mar. 11, 2005.

(51) Int. Cl.
C08F 255/00 (2006.01)
C08F 271/02 (2006.01)
C10M 159/18 (2006.01)

(52) U.S. Cl.
USPC ............ 525/244; 525/281; 508/110; 508/230

(58) Field of Classification Search
USPC ............................ 508/110, 230; 525/244, 281
See application file for complete search history.

(56) References Cited

U.S. PATENT DOCUMENTS

| | | |
|---|---|---|
| 3,873,459 A | 3/1975 | Pawlak |
| 4,089,794 A | 5/1978 | Engel |
| 4,092,255 A | 5/1978 | Chapelet et al. ................. 252/50 |
| 4,137,185 A | 1/1979 | Gardiner et al. |
| 4,146,489 A | 3/1979 | Stambaugh et al. ............. 252/50 |
| 4,160,739 A | 7/1979 | Stambaugh et al. |
| 4,259,195 A * | 3/1981 | King et al. ..................... 508/543 |
| 4,320,019 A | 3/1982 | Hayashi |
| 4,505,834 A | 3/1985 | Paypay |
| 4,517,104 A | 5/1985 | Bloch et al. |
| 4,632,769 A | 12/1986 | Gutierrez et al. |
| 4,640,788 A | 2/1987 | Kapuscinski |
| 4,693,838 A | 9/1987 | Varma et al. |
| 4,780,228 A | 10/1988 | Gardiner et al. |
| 4,780,230 A | 10/1988 | Liu et al. |
| 4,810,754 A | 3/1989 | McCrary |
| 4,812,261 A | 3/1989 | Liu et al. |
| 4,863,623 A | 9/1989 | Nalesnik |
| 4,877,834 A | 10/1989 | Liu et al. |
| 4,904,401 A | 2/1990 | Ripple |
| 4,904,404 A | 2/1990 | Liu et al. |
| 4,969,912 A | 11/1990 | Kelman et al. |
| 5,149,895 A | 9/1992 | Coolbaugh et al. |
| 5,167,845 A | 12/1992 | Derosa |
| 5,167,848 A | 12/1992 | Chung |
| 5,219,480 A | 6/1993 | Gutierrez |
| 5,275,747 A | 1/1994 | Gutierrez |
| 5,294,354 A | 3/1994 | Papke |
| 5,298,565 A | 3/1994 | Lange |
| 5,328,624 A | 7/1994 | Chung |
| 5,346,635 A | 9/1994 | Khorramian et al. ........ 252/33.3 |
| 5,424,357 A | 6/1995 | Larson |
| 5,424,367 A | 6/1995 | Auda |
| 5,427,702 A | 6/1995 | Chung |
| 5,439,605 A | 8/1995 | Khorramian et al. ........ 252/33.3 |
| 5,523,008 A | 6/1996 | Boden et al. ..................... 252/50 |
| 5,527,624 A | 6/1996 | Higgins et al. |
| 5,563,118 A | 10/1996 | Mishra et al. |
| 5,633,415 A | 5/1997 | Brandes et al. |
| 5,637,783 A | 6/1997 | Brandes et al. |
| 5,650,381 A * | 7/1997 | Gatto et al. ................... 508/364 |
| 5,652,201 A | 7/1997 | Paypay |
| 5,663,126 A | 9/1997 | Boden et al. .................. 508/221 |
| 5,759,967 A * | 6/1998 | Song et al. ..................... 508/454 |
| 5,773,524 A | 6/1998 | Coolbaugh et al. |
| 5,780,540 A | 7/1998 | Brandes et al. |
| 5,814,586 A | 9/1998 | Boden et al. |
| 5,874,389 A | 2/1999 | Boden et al. |
| 6,034,038 A | 3/2000 | Lockwood et al. ........... 508/183 |
| 6,034,184 A | 3/2000 | Coolbaugh et al. |
| 6,054,539 A | 4/2000 | Coolbaugh et al. |
| 6,100,224 A | 8/2000 | Peiffer et al. |
| 6,103,676 A | 8/2000 | Coolbaugh et al. |
| 6,107,257 A | 8/2000 | Valcho et al. |
| 6,162,768 A | 12/2000 | Coolbaugh et al. |

(Continued)

FOREIGN PATENT DOCUMENTS

CN 1137283 12/1996
DE 19607641 A1 9/1997

(Continued)

OTHER PUBLICATIONS

Australian Patent Office Search Report Application No. SG 200406722-9, Feb. 24, 2006.
European Search Report corresponding to European Patent Application Serial No. 04257231.3-2103, dated Mar. 28, 2006.
European Search Report corresponding to European Patent Application Serial No. 03734186.4-1214 dated Aug. 7, 2008, 5 pages.
Aldrich Handbook of Fine Chemicals; 1996-1997; p. 986; Cat. No. 14607-2; "N,N' Methylenebisacrylamide".
Zu, Jianhua et al., "The Preparation of Sodium Styrene Sulfonatepolyethylene Grafted Membranes", Journal of Radiation Research and Radiation Processing, vol. 1 18(3), 168-169 (2000), with English abstract.
Moad, G., The synthesis of polyolefin graft copolymers by reactive extrusion, Prog. Polym. Sci. 24 (1999) 81-142.
Citovicky, P., et al., The copolymerization of styrene and maleic anhydride initiated by peroxides of isotactic polypropylene, Eur. Polym. J. (1996) vol. 32, No. 2, 153-158.

(Continued)

Primary Examiner — Ellen M McAvoy
Assistant Examiner — Vishal Vasisth
(74) Attorney, Agent, or Firm — McAndrews, Held & Malloy, Ltd.

(57) ABSTRACT

A multiple function polymer comprising a graft polymer of a polyolefin, a nitrogenous, ethylenically unsaturated, aliphatic or aromatic monomer having from 2 to about 50 carbon atoms, and an organo-metallic compound capable of reacting with said polyolefin is disclosed. Also disclosed is a process for making said multiple function graft polymer. Also disclosed is a lubricating oil comprising a lubricant base oil, the multiple function polymer, and optionally other dispersants. Also disclosed is a multiple function polymer comprising a graft polymer of a polyolefin, and an organo-metallic compound capable reacting with said polyolefin, and a process for making the same.

21 Claims, No Drawings

(56) References Cited

U.S. PATENT DOCUMENTS

| | | |
|---|---|---|
| 6,187,721 B1 | 2/2001 | Goldblatt |
| 6,215,033 B1 | 4/2001 | Coolbaugh et al. |
| 6,228,817 B1 | 5/2001 | Coolbaugh et al. |
| 6,248,702 B1 | 6/2001 | Coolbaugh et al. |
| 6,300,289 B1 | 10/2001 | Boden et al. |
| 6,319,881 B1 | 11/2001 | Coolbaugh et al. |
| 6,410,652 B1 | 6/2002 | Goldblatt et al. |
| 6,472,353 B1 | 10/2002 | Smoggie et al. |
| 6,686,321 B2 | 2/2004 | Boden et al. |
| 6,715,473 B2 | 4/2004 | Ritchie et al. |
| 6,750,183 B2 | 6/2004 | Gutierrez et al. |
| 6,759,375 B2 | 7/2004 | Curtis et al. |
| 6,767,871 B2 | 7/2004 | Devlin et al. |
| 6,939,420 B2 | 9/2005 | Pollack |
| 7,144,951 B2 | 12/2006 | Dyuck et al. |
| 7,253,231 B2 | 8/2007 | Devlin et al. |
| 7,371,713 B2 | 5/2008 | Goldblatt et al. |
| 2002/0042349 A1* | 4/2002 | Boden et al. .......... 508/221 |
| 2004/0043909 A1 | 3/2004 | Goldblatt |
| 2004/0259742 A1 | 12/2004 | Mishra et al. |
| 2005/0192407 A1* | 9/2005 | Gauthy ............ 525/244 |
| 2005/0209113 A1 | 9/2005 | Goldblatt |
| 2006/0003905 A1 | 1/2006 | Devlin et al. |
| 2006/0025316 A1 | 2/2006 | Covitch et al. |
| 2006/0205611 A1 | 9/2006 | Sauer |
| 2007/0149414 A1 | 6/2007 | Ruhe et al. |
| 2008/0293600 A1 | 11/2008 | Goldblatt et al. |

FOREIGN PATENT DOCUMENTS

| | | | |
|---|---|---|---|
| EP | 0000648 | 2/1979 | |
| EP | 0336716 | 10/1989 | |
| EP | 0352070 | 1/1990 | |
| EP | 0352072 | 1/1990 | |
| EP | 0 438 848 | 7/1991 | |
| EP | 0837122 | 4/1998 | |
| EP | 927754 | 7/1999 | |
| EP | 0980891 | 2/2000 | |
| EP | 1533293 | 5/2005 | |
| GB | 1390851 | 4/1975 | |
| GB | 1 531 945 | 11/1978 | |
| GB | 2097800 | 11/1982 | |
| IN | IN738/MMNP/2004 | 4/2005 | |
| JP | 2001-524580 A | 12/2001 | |
| JP | 2005042116 A | 2/2005 | |
| SG | 112056 | 6/2005 | |
| WO | WO95/16744 | 6/1995 | |
| WO | WO95/18199 | 6/1995 | |
| WO | WO9612746 A1 | 5/1996 | |
| WO | 9747709 | 12/1997 | .......... C10M 149/10 |
| WO | 98/17696 | 4/1998 | |
| WO | WO 00/37449 | 6/2000 | |
| WO | WO01/19882 | 3/2001 | |
| WO | WO 03020853 | 3/2003 | |
| WO | WO03/099890 | 12/2003 | |
| WO | WO 2006084698 | 8/2006 | |
| WO | WO2006/099250 | 9/2006 | |
| WO | WO2006/116663 | 11/2006 | |
| WO | WO 2006133848 | 12/2006 | |

OTHER PUBLICATIONS

Deng, J. et al., Grafting copolymerization of styrene and maleic anhydride binary monomer systems induced by UV irradiation, Eur. Polym. J. 41 (2005) 2685-2692.

Li, Y., et al., Study on styrene-assisted melt free-radical grafting of maleic anhydride onto polypropylene, Polymer 42 (2001) 3419-3425.

* cited by examiner

MULTIPLE FUNCTION GRAFT POLYMER

This application claims the benefit of U.S. Provisional Patent Application No. 60/661,205 filed Mar. 11, 2005, which is incorporated herein by reference in its entirety.

FIELD OF THE INVENTION

The present invention relates to novel multiple function graft polymers with polyolefin backbones. The polyolefins are grafted with monomers associated with dispersancy that demonstrate sludge and varnish control as well as monomers associated with friction modifier and anti-wear properties to provide a graft polymer exhibiting multiple performance attributes.

The present invention further relates to the method for manufacturing these novel multiple-function graft polymers.

The invention still further relates to lubricating oil compositions containing these novel multiple-function polymers as an additive that displays dispersant performance characteristics as well as friction and anti-wear properties.

BACKGROUND OF THE INVENTION

Lubricating oil compositions used to lubricate internal combustion engines contain a base oil of lubricating viscosity, or a mixture of such oils, and additives used to improve the performance characteristics of the oil. For example, additives are used to improve detergency, to reduce engine wear, to provide stability against heat and oxidation, to reduce oil consumption, to inhibit corrosion, to act as a dispersant, and to reduce friction loss. Some additives provide multiple benefits, such as a dispersant/viscosity modifier. Other additives, while improving one characteristic of the lubricating oil, have an adverse effect on other characteristics. Thus, to provide a lubricating oil having optimal overall performance, it is necessary to characterize and understand all the effects of the various additives available, and carefully balance the additive content of the lubricant. Moreover, each of the additives is a separate component of the formulated lubricating oil and adds cost. Thus, it would be beneficial to have a multi-functional additive that controls more than one performance characteristic of the lubricating oil.

To provide improved wear performance, conventional lubricants are formulated with an anti-wear additive. Metal hydrocarbyl dithiophosphates, particularly zinc dialkyldithiophosphates (ZDDP), are the primary anti-wear additive used in lubricating oils for internal combustion engines. ZDDP provides excellent wear protection at a comparatively low cost and also functions as an antioxidant. However, there is some evidence that phosphorus in lubricants can shorten the effective life of automotive emission catalysts. Accordingly, industry has limited the amount of phosphorus that lubricants can contain. The previous industry category (ILSAC GF-3) mandated a lubricant phosphorus limit of 1000 ppm. The current category of service fill oils in the United States (ILSAC GF-4) mandates even more stringent limits, a maximum phosphorus content of no more than 800 ppm. Future standards may require even more stringent limits, such as a maximum phosphorus content of no more than 500 ppm.

To meet these emerging requirements, it would therefore be advantageous to provide lubricating oils, particularly lubricating oils formulated with base oils having relatively high viscosity indices and low volatilities for improved fuel economy, that also provide excellent low temperature valve train wear performance and anti-oxidant properties with reduced amounts of phosphorus-containing anti-wear additives.

U.S. Pat. Nos. 5,346,635 and 5,439,605 describe lubricating oils completely free of phosphorus-containing anti-wear additives containing a complex blend of ashless friction reducers, ashless anti-wear/extreme pressure additives, anti-oxidants, metal detergents and polymeric viscosity modifiers and flow improvers, which compositions purportedly provide acceptable properties. These compositions may also contain a molybdenum-containing additive as a friction modifier.

U.S. Pat. No. 5,523,008 (the '008 patent), which is incorporated herein by reference in its entirety, describes polyolefins containing nitrogen-containing and/or oxygen-containing monomers for use as dispersant viscosity index improvers. The grafted polyolefin contains at least about 13 moles of N-vinylimidazole (similarly known as 1-vinylimidazole), or other ethylenically-unsaturated nitrogen-containing and/or oxygen-containing monomers, per mole of a grafted polyolefin backbone. Also described is a lubricating oil comprising a lubricant base oil and a grafted polyolefin as described above as well as a method of making a dispersant-viscosity index improver. N-vinylimidazole or other ethylenically unsaturated nitrogen-containing and/or oxygen-containing monomers and a graftable polyolefin are reacted with sufficient initiator to graft at least about 13 moles of the monomer to each mole of the polyolefin.

The inventors of the present invention have now discovered a novel multi-function graft polymer useful as an additive for lubricating oil compositions. The multiple function graft polymer operates as a dispersant viscosity index improver, as well as an anti-wear additive without having an adverse effect on anti-oxidant properties.

SUMMARY OF THE INVENTION

One aspect of the invention is a multiple function polymer comprising a graft polymer of a polyolefin, a nitrogenous, ethylenically unsaturated, aliphatic or aromatic monomer having from 2 to about 50 carbon atoms, and an organo-metallic compound capable of reacting with said polyolefin.

Generally, the nitrogenous, ethylenically unsaturated, aliphatic or aromatic monomers having 2 to about 50 carbon atoms, and combinations thereof, are contemplated for use as graftable monomers imparting dispersancy (graftable amines) which is associated with sludge and varnish handling.

Organo-metallic compounds suitable for imparting anti-wear properties are those which are capable of reacting with the polyolefin. The organo-metallic compounds comprise metal carboxylates and metal oxides, and further comprise a metallic member selected from the group consisting of molybdenum, cobalt, titanium, calcium, magnesium, manganese, bismuth, tungsten, and copper. In some aspects of the invention, the organo-metallic compounds are molybdenum compounds.

The multiple function grafted polymer contains from about 8 moles of graft amine monomer to about 16 moles graft amine monomer and about 2 moles anti-wear monomer to about 5 moles of anti-wear monomer. The multiple function polymer has a weight average molecular weight of from about 20,000 to about 500,000, a polydispersity from about 1 to about 15, and a molar proportion of grafted monomer to the polymer of at least about 13:1.

Another aspect of the invention is a multiple function polymer comprising a graft polymer of: i. a polyolefin having a weight average molecular weight from about 20,000 to about 500,000 and a polydispersity of from about 1 to about 15; ii. a nitrogenous, ethylenically unsaturated, aliphatic or aromatic monomer having from 2 to about 50 carbon atoms, selected from the group consisting of 1-vinylimidazole, 1-vinyl-2-pyrrolidinone, N-allylimidazole, 1-vinylpyrrolidinone, 2-vinylpyridine, 4-vinylpyridine, N-methyl-N-vinylacetamide, diallyl formamide, N-methyl-N-allyl formamide, N-ethyl-N-allyl formamide, N-cyclohexyl-N-allyl formamide, 4-methyl-5-vinyl thiazole; N-allyl diisooctyl phenothiazine; 2-methyl-1-vinylimidazole, 3-methyl-1-vinylpyrazole, N-vinylpurine, N-vinylpiperazines, vinylpiperidines, vinylmorpholines, and combinations thereof; and iii. an organo-metallic compound capable of reacting with said polyolefin, selected from the group consisting of molybdenum boro neodecanoate, molybdenum 2-ethylhexanoate 4-nonyloxybenzoate, molybdenum (isosterate) (4-nonyloxybenzoate), molybdenum dodecylbenzenesulfonate, molybdenum $C_{18}$ branched-linear carboxylate, molybdenum $C_{36}$ linear carboxylate, molybdenum $C_{36}$+-$C_{18}$ branched-linear carboxylate, molybdenum $C_{36}$ branched-linear carboxylate, molybdenum $C_{36}/C_{36}$+ linear carboxylate, molybdenum $C_{36}$+ branched alkyl carboxylate/t-butyl benzoate, molybdenum $C_{18}$ branched alkyl carboxylate/t-butyl benzoate, molybdenum oleate, molybdenum $C_{18}$ linear alkyl carboxylate/t-butyl benzoate, molybdenum octoate, molybdenum acetylacetonate, and combinations thereof. In one aspect of the invention, the organo-metallic compounds may contain at least one $C_6$ to $C_{40}$ carboxylate moiety which may be linear and/or branched. In another aspect, the organo-metallic compounds may be molybdenum carboxylates containing at least one linear and/or branched carboxylate moiety having $C_6$-$C_{40}$ carbon atoms.

Another aspect of this invention is a multiple function polymer comprising a graft polymer of a molybdenum compound selected from the group consisting of molybdenum boro neodecanoate, molybdenum octoate, molybdenum acetylacetonate, and combinations thereof and a polyolefin comprising the graft reaction product of a nitrogenous, ethylenically unsaturated, aliphatic or aromatic monomer having from 2 to about 50 carbon atoms grafted on a polymer, said graft polymer having a weight average molecular weight of from about 20,000 to about 500,000 and a molar proportion of grafted monomer to the polymer of at least about 13:1.

Another aspect of the invention is a process for making a multiple function graft polymer. The process comprises the steps of providing a polyolefin, an initiator and a nitrogenous, ethylenically unsaturated, aliphatic or aromatic monomer having from 2 to about 50 carbon atoms capable reacting with said polyolefin. The polyolefin is dissolved in a solvent, forming a solution, and the monomer is dispersed in said solution. The initiator is added to said solution, said step being carried out at a temperature exceeding the initiation temperature of said initiator thereby forming a dispersant polymer. The solution is maintained at said temperature and an organo-metallic compound is added, thereby forming said multiple function polymer.

Another aspect of the invention is a process for making a multiple function polymer comprising the steps of: i. providing a polyolefin having a weight average molecular weight of from about 20,000 to about 500,000, an initiator and a nitrogenous, ethylenically unsaturated, aliphatic or aromatic monomer having from 2 to about 50 carbon atoms, selected from the group consisting of 1-vinylimidazole, 1-vinyl-2-pyrrolidinone, N-allylimidazole, 1-vinylpyrrolidinone, 2-vinylpyridine, 4-vinylpyridine, N-methyl-N-vinylacetamide, diallyl formamide, N-methyl-N-allyl formamide, N-ethyl-N-allyl formamide, N-cyclohexyl-N-allyl formamide, 4-methyl-5-vinyl thiazole; N-allyl diisooctyl phenothiazine; 2-methyl-1-vinylimidazole, 3-methyl-1-vinylpyrazole, N-vinylpurine, N-vinylpiperazines, vinylpiperidines, vinylmorpholines, and combinations thereof, capable reacting with said polyolefin; ii. dissolving said polyolefin in a solvent, forming a solution; iii. dispersing said monomer in said solution; iv. adding said initiator to said solution, said step being carried out at a temperature exceeding the initiation temperature of said initiator thereby forming a dispersant polymer; and v. maintaining the solution at said temperature and adding an organo-metallic compound selected from the group consisting of: molybdenum boro neodecanoate, molybdenum 2-ethylhexanoate 4-nonyloxybenzoate, molybdenum (isosterate) (4-nonyloxybenzoate), molybdenum dodecylbenzenesulfonate, molybdenum $C_{18}$ branched-linear carboxylate, molybdenum $C_{36}$ linear carboxylate, molybdenum $C_{36}$+-$C_{18}$ branched-linear carboxylate, molybdenum $C_{36}$ branched-linear carboxylate, molybdenum $C_{36}/C_{36}$+ linear carboxylate, molybdenum $C_{36}$+ branched alkyl carboxylate/t-butyl benzoate, molybdenum $C_{18}$ branched alkyl carboxylate/t-butyl benzoate, molybdenum oleate, molybdenum $C_{18}$ linear alkyl carboxylate/t-butyl benzoate, molybdenum octoate, molybdenum acetylacetonate, and combinations thereof; thereby forming said multiple function polymer.

Another aspect of the invention is a lubricating oil composition comprising a lubricant base oil, at least about 0.1 wt % by composition weight of the multiple function polymer; and from 0% to about 4% by composition weight of other dispersants. The multiple function grafted polymer functions as an anti-wear, dispersant viscosity index improver (VII) additive to control sludge, varnish as well as impart anti-wear properties. Such lubricating oil employs both the superior dispersancy and anti-wear properties of the multiple function grafted polymer, thereby requiring fewer additives.

In another aspect of the invention, the multiple function grafted polymer functions as an anti-wear viscosity index improver (VII) additive only Another aspect of the invention comprises a multiple function polymer comprising a graft polymer of:
  a. a polyolefin, and
  b. an organo-metallic compound capable reacting with said polyolefin.

Another aspect of the invention comprises a process for making a multiple function polymer comprising the steps of:
  a. providing a polyolefin, an initiator and an organo-metallic compound capable reacting with said polyolefin;
  b. dissolving said polyolefin in a solvent, forming a solution;
  c. dispersing said organo-metallic compound in said solution;
  d. adding said initiator to said solution, said step being carried out at a temperature exceeding the initiation temperature of said initiator thereby forming a multiple function polymer.

Another aspect of the invention comprises a lubricating oil comprising:
  a. a lubricant base oil;
  b. at least about 0.1 wt % by composition weight of a multiple function polymer comprising a graft polymer of a polyolefin and an organo-metallic compound capable reacting with said polyolefin; and
  c. from 0% to about 4% by composition weight of other dispersants.

The use of the present grafted polymers has many significant formulation advantages. The high sulfur and phosphorous content normally caused by the presence of conventional anti-wear agents may be largely eliminated. This invention enables the industry to meet the sulfur and phosphorous limitation on the next category of service fill oils in the United States with more stringent limits, such as a maximum phosphorus content of no more than 800 ppm, or even 500 ppm. Another advantage of the present invention is that lubricant compositions that use the grafted polymer, in general, are much less expensive than lubricant compositions that use conventional anti-wear agents. This means that the formulations of the present invention are more economical than previous lubricant formulations which use less-grafted polymers and more of the conventional anti-wear agents. A further advantage of the invention is to provide grafted polymers which minimally require use of additives that increase the low temperature viscosity of oil blends, which therefore permits use of higher-viscosity base stock which provides better lubrication at high operating temperatures. Moreover, an improvement in wear is achieved when the present invention is used and the amount of the conventional anti-wear agents is reduced or eliminated and the anti-oxidant properties are improved.

DETAILED DESCRIPTION OF THE INVENTION

While the invention will be described in connection with one or more specific embodiments, it will be understood that the invention is not limited to those embodiments. On the contrary, the invention includes all alternatives, modifications and equivalents as may be included within the spirit and scope of the appended claims.

The novel multiple function polymer according to the present invention is made by reaction of a polyolefin, dissolved in a hydrocarbon base stock, with ethylenically unsaturated, aliphatic or aromatic monomers having 2 to about 50 carbon atoms containing oxygen and/or nitrogen in the presence of an initiator to form a dispersant polymer. The monomer associated with friction and anti-wear properties is then reacted with the dispersant polymer to form the multiple function graft polymer.

Reaction Materials

The following are examples of polyolefins, graftable amines that impart dispersancy, initiators and organo-metallic compounds capable of coordinating with the graftable amine contemplated for use herein to make the present multiple function graft polymer.

Polyolefins

A wide variety of polyolefins (with and without pendant unsaturation) are contemplated for use herein as a backbone for grafting. Exemplary polymers contemplated for use herein include the polyolefins suggested by U.S. Pat. No. 4,092,255, which is incorporated herein by reference in its entirety, at col. 1, lines 29-32: polyisobutene, polyalkylstyrenes, partially hydrogenated polyolefins of butadiene and styrene, and amorphous polyolefins of ethylene and propylene. EPDM (ethylene/propylene/diene monomer) rubbers are also contemplated for use herein.

Particular materials contemplated for use herein include ethylene/propylene polyolefins containing from about 30% to about 80% ethylene and from about 70% to about 20% propylene moieties by number, optionally modified with from 0% to about 9% diene monomers. Exemplary diene monomers are 1,4-butadiene, isoprene, 1,4-hexadiene, dicyclopentadiene, 2,5-norbornadiene, ethylidene-norbornene, the dienes recited in U.S. Pat. No. 4,092,255, col. 2, lines 36-44 (which are incorporated herein by reference), or combinations of more than one of them.

The polyolefins contemplated herein may have weight average molecular weights of from about 20,000 to about 500,000, and polydispersities of from about 1 to about 15.

Specific materials which are contemplated for use herein include: Mitsui VISNEX polymers, which are terpolymers of ethylene, propylene, and ethylidene-norbornene, CAS No. 25038-36-2, sold by Mitsui Petrochemical Industries, Ltd., Tokyo, Japan; VISTALON ethylene/propylene polyolefins, sold by Exxon Chemical Americas, Houston, Tex.; ethylene propylene polymers, CAS No. 9010-79-1, and ter-polyolefins (EPDM) CAS No. 25038-36-2 sold under the DUTRAL name by Polimeri Europa, Ferrara, Italy.

Graftable Amine

Amines suitable for imparting dispersancy, which is associated with sludge and varnish handling, are very broadly, ethylenically unsaturated, aliphatic or aromatic monomers having from 2 to about 50 carbon atoms containing oxygen- and/or nitrogen, as well as combinations of such monomers, are contemplated for use as graftable monomers imparting dispersancy. Specific graftable monomers contemplated for use herein include the following: N-vinylimidazole (1-vinylimidazole), 1-vinyl-2-pyrrolidinone, C-vinylimidazole, N-allylimidazole, 1-vinylpyrrolidinone, 2-vinylpyridine, 4-vinylpyridine, N-methyl-N-vinylacetamide, diallyl formamide, N-methyl-N-allyl formamide, N-ethyl-N-allyl formamide, N-cyclohexyl-N-allyl formamide, 4-methyl-5-vinyl thiazole; N-allyl diisooctyl phenothiazine; 2-methyl-1-vinylimidazole, 3-methyl-1-vinylpyrazole, N-vinylpurine, N-vinylpiperazines, vinylpiperidines, vinylmorpholines as well as combinations of these materials or other similar materials. A more complete description of graftable amines contemplated for use herein can be found in the '008 patent col. 5 lines 3-43 (which are incorporated herein by reference).

Free-Radical Initiators

Broadly, any free-radical initiator capable of operating under the conditions of the reactions is contemplated for use. Representative initiators are disclosed in U.S. Pat. No. 4,146,489, which is incorporated herein by reference in its entirety, at column 4, lines 45-53. Specific "peroxy" initiators contemplated include alkyl, dialkyl, and aryl peroxides, for example: di-t-butyl peroxide (abbreviated herein as "DTBP"), dicumyl peroxide, t-butyl cumyl peroxide, benzoyl peroxide, 2,5-dimethyl-2,5-di(t-butylperoxy)hexane, and 2,5-dimethyl-2,5-di (t-butylperoxy)hexyne-3. Also contemplated are peroxyester and peroxyketal initiators, for example: t-butylperoxy benzoate, t-amylperoxy benzoate, t-butylperoxy acetate, t-butylperoxy benzoate, di-t-butyl diperoxyphthalate, and t-butylperoxy isobutyrate. Also contemplated are hydroperoxides, for example: cumene hydroperoxide, t-butyl hydroperoxide, and hydrogen peroxide. Also contemplated are azo initiators, for example: 2-t-butylazo-2-cyanopropane, 2-t-butylazo-1-cyanocyclohexane, 2,2'-azobis(2,4-dimethyl-pentane nitrile), 2,2'-azobis(2-methylpropane nitrile), 1,1'-azobis(cyclohexanecarbonitrile), and azoisobutyronitrile (AIBN). Other similar materials are also contemplated such as, but not limited to, diacyl peroxides, ketone peroxides and peroxydicarbonates. It is also contemplated that combinations of more than one initiator, including combinations of different types of initiators, may be employed.

Each initiator commonly has a characteristic minimum temperature, above which it will readily initiate a reaction and below which initiation will proceed more slowly or not at all. Consequently, the minimum reaction temperature is commonly directed by the effective characteristic minimum initiation temperature of the initiator.

Anti-Wear Monomer

In general, any organo-metallic compound including, but not limited to, metal carboxylates, such as metal acetylacetonates, and metal oxides that can react with the polyolefin backbone are contemplated for use herein. For example, organo-metallic compounds comprised of a metal oxide reacted with an acid ligand of the Structure A below can react with the polyolefin and/or the amine grafted polyolefin. Organo-metallic compounds comprise a metallic member selected from the group consisting of molybedenum, cobalt, titanium, calcium, magnesium, manganese, bismuth, tungsten, and copper. Optionally, molybdic acid is contemplated for use herein In one aspect of the invention, the organo-metallic compounds may contain one or more $C_6$ to $C_{40}$ carboxylate moieties which may be linear and/or branched. In another aspect, the organo-metallic compound may be a molybdenum carboxylate containing one or more linear and/or branched carboxylate moieties having $C_6$-$C_{40}$ carbon atoms.

Preferably, the organo-metallic compounds are molybdenum compounds. Organo-metallic compounds suitable for use in the present invention also include molybdenum boro neodecanoate (sometimes also referred to as molybdenum borate neodecanoate), molybdenum 2-ethylhexanoate 4-nonyloxybenzoate, molybdenum (isosterate) (4-nonyloxybenzoate), molybdenum dodecylbenzenesulfonate, molybdenum $C_{18}$ branched-linear carboxylate, molybdenum $C_{36}$ linear carboxylate, molybdenum $C_{36}$+-$C_{18}$ branched-linear carboxylate, molybdenum $C_{36}$ branched-linear carboxylate, molybdenum $C_{36}$/$C_{36}$+ linear carboxylate, molybdenum $C_{36}$+ branched alkyl carboxylate/t-butyl benzoate, molybdenum $C_{18}$ branched alkyl carboxylate/t-butyl benzoate, molybdenum oleate, molybdenum $C_{18}$ linear alkyl carboxylate/t-butyl benzoate, bismuth octoate, bismuth neodecanoate, sodium salt of tungsten/2-ethylhexanoate, which may be obtained from Shepherd Chemical Company, 4900 Beech Street, Norwood, Ohio 45212-2398.

In one preferred embodiment molybdenum acetylacetonate is used. In another preferred embodiment molybdenum boro neodecanoate is used. In another preferred embodiment molybdenum octoate is used.

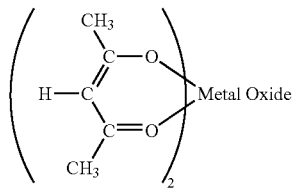

Structure A

Solvent Reaction Conditions

In general, to prepare a multiple function graft polymer which displays dispersant viscosity index improver and anti-wear properties the graftable amine is grafted onto the polymer backbone and the anti-wear monomer then reacted with the graftable amine. To achieve good performance with respect to dispersancy and anti-wear properties, a graftable amine, such as N-vinylimidazole (VIMA), is first grafted onto the polymer using a free-radical initiator forming a dispersant viscosity index improver as taught and claimed in the '008 patent. Afterwards, the monomer or monomer grouping associated with anti-wear properties, e.g., molybdenum acetylacetonate is introduced and reacted with the graftable amine. Hence, the reactants comprise a polymer, a graftable amine, a free-radical initiator to promote the grafting reaction and a molybdenum compound.

More particularly, preparation of the multiple function graft polymer is carried out as follows. The polymer to be grafted is provided in fluid form. For example, the polymer may be dissolved in a solvent, which may be hydrocarbon base oil for a lubricating composition or another suitable solvent.

The reaction mixture thus formed is placed in a suitable reactor such as a resin kettle with a $CO_2$ purge over the surface of the reaction mixture and the solution heated to the desired reaction temperature. At a minimum the reaction temperature should be sufficient to consume essentially all of the selected initiator during the time allotted for the reaction. For example, if di-t-butyl peroxide (DTBP) is used as the initiator the reaction temperature should be greater than about 165° C., alternatively greater than about 170° C., alternatively greater than 175° C. Different initiators work at different rates for a given reaction temperature. Therefore, the choice of a particular initiator may require adjustment of reaction temperature or time.

The graftable amine is added to the polymer solution and dissolved. The contemplated proportions of the graftable amine to polymer are selected so that an effective percentage will graft directly onto the polymer backbone. The minimum molar proportions of graftable amine to polymer are at least about 13 moles. Alternative molar proportions of the graftable amine per mole of starting polymer are disclosed in the '008 patent col. 8 line 1-55.

The graftable amine many be introduced into the reactor all at once, in several discrete charges, or at a steady rate over an extended period. The desired minimum rate of addition of the graftable amine to the reaction mixture is at least about 0.1% and the maximum rate of addition is 100% of the necessary charge of graftable amine per minute.

The initiator can be added before, with or after the graftable amine. The initiator may be added in discreet charges or all at once. In one embodiment the initiator is added with the graftable amine over a period of one hour. The desired rate of addition of the initiator to the reaction mixture is at least about 0.1%, alternatively at least about 5%, and alternatively at least about 20% of the necessary charge of initiator per minute. Alternative rates of addition of the graftable amine and initiator are disclosed in the '008 patent col. 8 line 56-col. 11 line 10.

While the initiator can be added neat, it is preferably cut back with a solvent to avoid high localized proportions of the initiator as it enters the reactor. In a preferred embodiment, it is substantially diluted with the reaction solvent. The initiator can be diluted by at least 5 times, alternatively at least about 10 times, alternatively at least about 20 times its weight or volume with a suitable solvent or dispersing medium.

After addition of initiator and graftable amine is completed, the reaction mixture is preferably mixed with heating for an additional 2-120 minutes, to completion. The time required for completion of the reaction can be determined by experiment, by determining when the proportion of nitrogen, or of the graftable amine in solution, reaches a value at or approaching a minimum pre-established value, or when the viscosity approaches a near constant value. The test method used to determine percent nitrogen can be found in the '008 patent col. 11 lines 35 to col. 12 line 67.

The reaction temperature is maintained and the organometallic compound associated with anti-wear is introduced. The contemplated proportions of the organo-metallic compound to graftable amine are selected so that an effective percentage will coordinate or react with the amine. The organo-metallic compound may be introduced into the reactor all at once, in several discrete charges, or at a steady rate over an extended period. The desired minimum rate of addition of the organo-metallic compound to the reaction mixture is at least about 0.1% and the maximum rate of addition is 100% of the necessary charge of organo-metallic compound per minute.

The solution is mixed thoroughly to incorporate the organo-metallic compound into the reaction mixture. After addition of organo-metallic compound is completed, the reaction mixture is preferably mixed with heating and a $CO_2$ purge for an additional 2-120 minutes, to completion.

Alternatively, an initiator can be added before, with or after the organo-metallic compound such as the molybdenum monomer. The initiator may be added in discreet charges or all at once. In one embodiment the initiator is added over a period of one hour after the molybdenum monomer is mixed thoroughly with the reaction mixture.

It is contemplated that the operative range for the total concentration of graft monomers is from 2 moles graft monomer per mole of polymer to about 20 moles graft monomer per mole of polymer. In one embodiment, the multiple function graft polymer has from about 8 moles to about 16 moles of graftable amine per mole of polymer and about from about 2 moles to about 5 moles molybdenum monomer per mole of polymer.

The present invention can alternatively be carried out by providing a melted reactant composition in an extruder or other polymeric mixer, for example, a Banbury Mill. The melt reaction can be carried out in accordance with that described in Column 13 line 1 to Column 14 line 24 of U.S. Pat. No. 5,663,126 which is incorporated herein by reference in its entirety.

Lubricating Oil Compositions

The lubricating oil compositions of the present invention preferably comprise the following ingredients in the stated proportions:

A. from about 70% to about 99% by weight, alternatively from about 80% to about 95% by weight, alternatively from about 88% to about 93% by weight, of one or more base oils (including base oil carried over from the making of the grafted polymer);

B. from about 0.05% solids to about to about 5% solids by weight, alternatively from about 0.15% solids to about 2% solids by weight, alternatively from about 0.15% solids to about 1.5% solids by weight, of one or more of the grafted polyolefins made according to this specification (i.e., not including base oil carried over from the making of the grafted polymer);

C. from about 0.0% solids to 2.0% solids by weight, alternatively from about 0.05% solids to about 1.0% solids by weight, alternatively from about 0.05% solids to about 0.7% solids by weight, alternatively from about 0.1% solids to about 0.7% solids by weight, of one or more polymers other than the grafted polymers according to the present invention;

D. from 0.0% to about 15% by weight, alternatively from about 0.5% to about 10% by weight, alternatively from about 0.5% to about 6% by weight, or alternatively from about 0.7% to about 6%, of one or more dispersants;

E. from about 0.3% to 6% by weight, alternatively from about 0.3% to 4% by weight, alternatively from about 0.5% to about 3% by weight, alternatively from about 0.5 to about 2% by weight, of one or more detergents;

F. from about 0.01% to 3% by weight, alternatively from about 0.04% to about 2.5% by weight, alternatively from about 0.06% to about 2% by weight, of one or more anti-wear agents which are not grafted polymers according to the present invention;

G. from about 0.01% to 5% by weight, alternatively from about 0.01% to 2% by weight, alternatively from about 0.05% to about 1.5% by weight, alternatively from about 0.1% to about 1% by weight, of one or more anti-oxidants; and H. from about 0.0% to 4% by weight, alternatively from about 0.0% to 3% by weight, alternatively from about 0.005% to about 2% by weight, alternatively from about 0.005% to about 1.5% by weight, of minor ingredients such as, but not limited to, friction modifiers, pour point depressants, and anti-foam agents.

The percentages of D through H may be calculated based on the form in which they are commercially available. The function and properties of each ingredient identified above and several examples of ingredients are summarized in the following sections of this specification.

Base Oils

Any of the petroleum or synthetic base oils previously identified as process solvents for the graftable polyolefins of the present invention can be used as the base oil. Indeed, any conventional lubricating oil, or combinations thereof, may also be used.

Composition of Grafted Polyolefins

The grafted polyolefins according to the present invention contain from about 8 moles to about 16 moles of graftable amine per mole of original polymer and from about 3 moles to about 5 moles of organo-metallic monomer, which is preferably a molybdenum monomer, per mole of original polymer.

The grafted polyolefins can be used in place of part, or all, of the viscosity index improving polyolefins conventionally used in such formulations. They can also be used in place of part or all of the anti-wear agents conventionally used in such formulations, as they possess anti-wear and friction modification properties.

Grafted polyolefins disclosed in prior art can also be used in combination with the grafted polyolefins disclosed in the present invention.

Non-Grafted Polyolefins

The conventional viscosity index improving polyolefins can be used in the formulations according to the present invention. These are conventionally long-chain polyolefins. Several examples of polyolefins contemplated for use herein include those suggested by U.S. Pat. No. 4,092,255, column 1, lines 29-32: polyisobutenes, polymethacrylates, polyalkylstyrenes, partially hydrogenated copolymers of butadiene and styrene, amorphous polyolefins of ethylene and propylene, ethylene-propylene diene polymers, polyisoprene, and styrene-isoprene.

Dispersants

Dispersants help suspend insoluble engine oil oxidation products, thus preventing sludge flocculation and precipitation or deposition of particulates on metal parts. Suitable dispersants include high molecular weight alkyl succinimides and the reaction products of oil-soluble polyisobutylene succinic anhydride with ethylene amines such as tetraethylene pentamine and borated salts thereof.

Such conventional dispersants are contemplated for use herein. Several examples of dispersants include those listed in U.S. Pat. No. 4,092,255, column 1, lines 38-41: succinimides or succinic esters, alkylated with a polyolefin of isobutene or propylene, on the carbon in the alpha position of the succinimide carbonyl. These additives are useful for maintaining the cleanliness of an engine or other machinery.

Detergents

Detergents to maintain engine cleanliness can be used in the present lubricating oil compositions. These materials include the metal salts of sulfonic acids, alkyl phenols, sulfurized alkyl phenols, alkyl salicylates, naphthenates, and other soluble mono- and dicarboxylic acids. Basic (vis, overbased) metal salts, such as basic alkaline earth metal sulfonates (especially calcium and magnesium salts) are frequently used as detergents. Such detergents are particularly useful for keeping the insoluble particulate materials in an engine or other machinery in suspension. Other examples of detergents contemplated for use herein include those recited in U.S. Pat. No. 4,092,255, column 1, lines 35-36: sulfonates, phenates, or organic phosphates of polyvalent metals.

Anti-Wear Agents

Anti-wear agents, as their name implies, reduce wear of metal parts. Zinc dialkyldithiophosphates and zinc diaryldithiophosphates and organo molybdenum compounds such as molybdenum dialkyldithiocarbamates are representative of conventional anti-wear agents that contain sulfur and phosphorous components that can poison automotive emission catalysts. Use of conventional anti-wear agents can be reduced or eliminated by the use of the grafted polyolefin of the present invention.

Anti-Oxidants

Oxidation inhibitors, or anti-oxidants, reduce the tendency of lubricating oils to deteriorate in service. This deterioration can be evidenced by increased oil viscosity and by the products of oxidation such as sludge and varnish-like deposits on the metal surfaces. Such oxidation inhibitors include alkaline earth metal salts of alkylphenolthioesters having preferably $C_5$ to $C_{12}$ alkyl side chains, e.g., calcium nonylphenol sulfide, dioctylphenylamine, phenyl-alpha-naphthylamine, phosphosulfurized or sulfurized hydrocarbons, and organo molybdenum compounds such as molybdenum dialkyldithiocarbamates.

Pour Point Depressants

Pour point depressants, otherwise known as lube oil flow improvers, lower the temperature at which the fluid will flow or can be poured. Such additives are well known. Typical of those additives which optimize the low temperature fluidity of a lubricant are $C_8$-$C_{18}$-dialkylfumarate vinyl acetate copolymers, and polymethacrylates.

Minor Ingredients

Many minor ingredients which do not prevent the use of the present compositions as lubricating oils are contemplated herein. A non-exhaustive list of other such additives includes rust inhibitors, as well as extreme pressure additives, friction modifiers, antifoam additives, and dyes.

The examples which follow illustrate the invention in more detail. The following Examples will serve to illustrate certain specific embodiments of the herein disclosed invention. These Examples should not, however, be construed as limiting the scope of the novel invention contained herein as there are many variations which may be made thereon without departing from the spirit of the disclosed invention, as those of skill in the art will recognize.

EXAMPLES

The following Examples describe methods of making multiple function polymers of the present invention.

Example 1

A 500 gram polymer solution sample was prepared in the following manner. The polymer Polimeri Europa CO-043 having a molecular weight of about 100,000 was diluted to 12.50% by weight in Exxon EHC-60 base oil and dissolved with heat and agitation. The mixture was then heated to 170° C. with a $CO_2$ purge over the surface of the reaction mixture. At this time the 0.50% by weight of 1-vinylimidazole (VIMA BASF Corp.) was added to the polymer mixture over a 60-minute period. Simultaneously to the VIMA addition, 0.30% by weight of di-t-butyl peroxide (DTBP Aldrich Chemical #16,8521-1) was added over a 60-minute period. Upon completion of the DTBP addition, the reaction was allowed to mix for 30 additional minutes. This reaction was followed by a second reaction.

This reaction began by heating and/or maintaining the reaction product of part (a) to or at 170° C. To the product of (a) was added 0.50% by weight of molybdenum acetylacetonate (Mo AcAc) (Gelest Inc. #-AKM550). This was added over a 1 minute period to the polymer mixture and allowed to mix thoroughly. After the monomer was incorporated to the reaction mixture the reaction was allowed to continue mixing with heating and a $CO_2$ purge for 60 additional minutes.

The resulting product contained the multiple function (viscosity index improver, dispersant, anti-wear) graft polymer of the present invention.

Example 2

A 500 gram polymer solution sample was prepared in the following manner. The graft polymer, Polimeri Europa CO-043 was diluted to 12.50% by weight in Exxon EHC-45 base oil and dissolved with heat and agitation. The mixture was then heated to 170° C. with a $CO_2$ purge over the surface of the reaction mixture. At this time the 0.50% by weight of 1-vinylimidazole (VIMA BASF Corp.) was added to the polymer mixture over a 60-minute period. Simultaneously to the VIMA addition, 0.30% by weight of di-t-butyl peroxide (DTBP Aldrich Chemical #16,8521-1) was added over a 60-minute period. Upon completion of the DTBP addition, the reaction was allowed to mix for 30 additional minutes. This reaction was followed by a second reaction.

At this time 0.50% by weight of molybdenum acetylacetonate available from Gelest Inc. (#-AKM550) was added to the polymer mixture over a 1 minute period and allowed to mix thoroughly. After the monomer was incorporated to the reaction mixture, 0.30% by weight of di-t-butyl peroxide (DTBP Aldrich Chemical #16,8521-1) was added over a 60-minute period. Upon completion of the DTBP addition, the reaction was allowed to continue mixing with heating for 30 additional minutes.

The resulting product contained the multiple function (viscosity index improver, dispersant, anti-wear) graft polymer of the present invention.

Example 3

A 500 gram polymer solution sample was prepared in the following manner. The polymer Polimeri Europa CO-043 was diluted to 12.50% by weight in Exxon EHC-60 base oil and dissolved with heat and agitation. The mixture was then heated to 170° C. with a $CO_2$ purge over the surface of the reaction mixture. At this time the 0.50% by weight of molybdenum acetylacetonate available from Gelest Inc. (#-AKM550) was added to the polymer mixture over a 1-minute period. The Moly AcAc was allowed to mix thoroughly into the VII solution. To the VII Moly AcAc solution was added 0.30% by weight of di-t-butyl peroxide (DTBP Aldrich Chemical #16,8521-1) over a 60-minute period. Upon completion of the DTBP addition, the reaction was allowed to mix for 30 additional minutes.

The resulting product contained the viscosity index improver graft polymer of the present invention.

Example 4

A 500 gram polymer solution sample was prepared in the following manner. The polymer Polimeri Europa CO-043 having a molecular weight of about 100,000 was diluted to 12.50% by weight in Exxon EHC-60 base oil and dissolved with heat and agitation. The mixture was then heated to 170° C. with a $CO_2$ purge over the surface of the reaction mixture. At this time the 0.50% by weight of 1-vinylimidazole (VIMA BASF Corp.) was added to the polymer mixture over a 60-minute period. Simultaneously to the VIMA addition, 0.30% by weight of di-t-butyl peroxide (DTBP Aldrich Chemical #16,8521-1) was added over a 60-minute period. Upon completion of the DTBP addition, the reaction was allowed to mix for 30 additional minutes. This reaction was followed by a second reaction.

This reaction began by heating and/or maintaining the reaction product of part (a) to or at 170° C. To the product of (a) was added 2.00% by weight of molybdenum octoate. This was added over a 1 minute period to the polymer mixture and allowed to mix thoroughly. After the monomer was incorporated to the reaction mixture the reaction was allowed to continue mixing with heating and a $CO_2$ purge for 60 additional minutes.

The resulting product contained the multiple function (viscosity index improver, dispersant, anti-wear) graft polymer of the present invention.

Example 5

A 500 gram polymer solution sample was prepared in the following manner. The polymer Polimeri Europa CO-043 having a molecular weight of about 100,000 was diluted to 12.50% by weight in Exxon EHC-60 base oil and dissolved with heat and agitation. The mixture was then heated to 170° C. with a $CO_2$ purge over the surface of the reaction mixture. At this time the 0.50% by weight of 1-vinylimidazole (VIMA BASF Corp.) was added to the polymer mixture over a 60-minute period. Simultaneously to the VIMA addition, 0.30% by weight of di-t-butyl peroxide (DTBP Aldrich Chemical #16,8521-1) was added over a 60-minute period. Upon completion of the DTBP addition, the reaction was allowed to mix for 30 additional minutes. This reaction was followed by a second reaction.

This reaction began by heating and/or maintaining the reaction product of part (a) to or at 170° C. To the product of (a) was added 1.00% by weight of molybdenum octoate. This was added over a 1 minute period to the polymer mixture and allowed to mix thoroughly. After the monomer was incorporated to the reaction mixture the reaction was allowed to continue mixing with heating and a $CO_2$ purge for 60 additional minutes.

The resulting product contained the multiple function (viscosity index improver, dispersant, anti-wear) graft polymer of the present invention.

Example 6

A 500 gram polymer solution sample was prepared in the following manner. The polymer Polimeri Europa CO-043 having a molecular weight of about 100,000 was diluted to 12.50% by weight in Exxon EHC-60 base oil and dissolved with heat and agitation. The mixture was then heated to 170° C. with a $CO_2$ purge over the surface of the reaction mixture. At this time the 0.50% by weight of 1-vinylimidazole (VIMA BASF Corp.) was added to the polymer mixture over a 60-minute period. Simultaneously to the VIMA addition, 0.30% by weight of di-t-butyl peroxide (DTBP Aldrich Chemical #16,8521-1) was added over a 60-minute period. Upon completion of the DTBP addition, the reaction was allowed to mix for 30 additional minutes. This reaction was followed by a second reaction.

This reaction began by heating and/or maintaining the reaction product of part (a) to or at 170° C. To the product of (a) was added 2.00% by weight of Molybdenum boro-neodecanoate (Mo boro NDA). This was added over a 1 minute period to the polymer mixture and allowed to mix thoroughly. After the monomer was incorporated to the reaction mixture the reaction was allowed to continue mixing with heating and a $CO_2$ purge for 60 additional minutes.

The resulting product contained the multiple function (viscosity index improver, dispersant, anti-wear) graft polymer of the present invention containing VIMA and molybdenum boro-neodecanoate.

Sequence IVA Valve Train Wear Evaluation

A Sequence IVA test was performed on two fully formulated lubricating oils containing reduced levels of the anti-wear additive ZDDP. One test blend contained the multiple function polymer of Example 1 and the other did not. The Sequence IVA engine valve train wear test is a fired engine-dynamometer lubricant test which evaluates the ability of a test lubricant to reduce camshaft lobe wear. The test method is a low temperature cyclic test, with a total running duration of 100 hours.

A 1994 Nissan model KA24E water cooled, 4 cycle, in-line cylinder, 2.389 (2.4) liter engine is used as the test apparatus. The engine incorporates a single overhead cam (SOHC), three valves per cylinder (2 intake; 1 exhaust), and sliding follower valve train design. An engine shortblock is utilized for 16 tests; a cylinder head assembly for 8 tests; and the critical test parts (camshaft, rocker arms, rocker shafts) are replaced every test. A 95 minute break-in schedule is conducted whenever the long block or cylinder head is replaced (before tests 1 and 9).

The Sequence IVA test is a flush and run type of lubricant test. Each individual test consists of two 20-minute flushes, followed by the 100-hour cyclic test. The cyclic test is comprised of 100 hourly cycles. Each cycle consists of two stages. The idle speed Stage 1 duration is 50 minutes; the 1500 r/min stage 2 operates for 10 minutes. The stages of the test cycle are set at the following conditions:

| Parameter | Units | Stage 1 | Stage 2 |
|---|---|---|---|
| Duration | Min | 50 | 10 |
| Engine Speed | r/min | 800 | 1500 |
| Engine Torque | N-m | 25 | 25 |
| Coolant Out Temperature | °C. | 50 | 55 |
| Oil Cylinder Head Temperature | °C. | 49 | 59 |
| Intake Air Temperature | °C. | 32 | 32 |
| Intake Air Pressure | kPa | 0.050 | 0.050 |
| Intake Air Humidity | g/kg | 11.5 | 11.5 |
| Exhaust Pressure | kPa-abs | 103.5 | 103.5 |

-continued

| Parameter | Units | Stage 1 | Stage 2 |
|---|---|---|---|
| Coolant Flow | L/min | 30 | 30 |
| Fresh Air Flow | SL/min | 10 | 10 |

Upon test completion, the camshaft is removed from the engine and measured for individual lobe wear at seven prescribed locations (nose; 14 degrees before and after the nose; 10 degrees before and after the nose; 4 degrees before and after the nose). For each lobe, the seven locations are summed to determine the lobe wear. Then the twelve lobes are averaged to compute the final test result. The results of the test are found in Table 1 below.

Example '008 Test blend with 0.63 solids dispersant VII with 0.035% Phosphorus. and Example TP Test blend with 0.63 solids dispersant VII Mo Octoate top treat Modified with 0.035% Phosphorus in Table 1 are comparison examples.

TABLE 1

Sequence IVA Comparative 5W-30 Low Phosphorous 0.04 (0.035) % wt.
Test Blends

| Test Parameter | Example '008 Test blend with 0.63 solids dispersant VII with 0.035% Phos. | Example 1 Test blend with 0.63 solids dispersant VII MoAcAc Modified with 0.035% Phos. | Example 4 Test blend with 0.63 solids dispersant VII Mo Octoate Modified with 0.035% Phos. | Example TP Test blend with 0.63 solids dispersant VII Mo Octoate top treat Modified with 0.035% Phos. | Example 6 Test blend with 0.63 solids dispersant VII Mo Boro NDA Modified with 0.035% Phos. | Test Limits GF-3/GF-4 |
|---|---|---|---|---|---|---|
| Average Cam Wear in microns | 101.52 | 47.18 | 51.33 | 66.35 | 27.82 | 120/90 |
| Fe ppm @ 100 hours | 113 | 57 | 42 | 54 | 19 | — |
| Intake Lobe Average wear in microns | 109.67 | 80.98 | 19.87 | 40.12 | 17.18 | — |
| Exhaust Lobe average wear in microns | 85.2 | 23.16 | 85.58 | 90.15 | 20.4 | — |
| Nose average wear in microns | 16.08 | 11.79 | 6.33 | 8.82 | 2.46 | — |

The results in Table 1 demonstrate that the multiple function polymer of the present invention reduces cam, lobe and nose wear as well as reduces the ppm of iron found in the oil after 100 hours in half. In addition, the test blend containing the graft polymer, Example 1 test blend of the present invention would pass GF-4 test limits while the test blend with ZDDP only would not. The results of Examples 4 and 6 also demonstrate a improved wear performance over the base blend utilizing the sole dispersant chemistry of the '008. The test blend, Example 4 which utilizes the molybdenum octoate reacted with the dispersant polymer chemistry of '008 it also demonstrates about 50% reduction in wear as well as the iron content at end of test. In the case of Example 6 test blend the which utilizes Mo Boro NDA reacted with the dispersant polymer chemistry of the '008 it also demonstrates about a 75% reduction in wear as well as the iron content at end of test. This further demonstrates the utility of this additive chemistry. In the case of Example TP (top treat) the Mo Octoate is not reacted with the dispersant polymer as in the previous examples. The Mo Octoate is added to the finished motor oil lubricant test blend. The test result is passing however the wear protection as demonstrated by the average cam, lobe and nose wear is not a affective. This result demonstrates the benefit of reacting the Mo Octoate with the dispersant polymer rather than adding to the finished blend.

Of the previous examples there is an additional benefit which is not apparent or demonstrated by the Sequence IVA test data's. The motor oil test blends prepared with the Mo octoate, Mo AcAc and Mo Boro NDA all demonstrate stable finished fluids, no fallout or instability. The test blend where the Mo octoate was added to the finished fluid (Example TP) shows signs of instability and fallout of the Mo chemistry. This further exemplifies the value of reacting the Mo compounds with the dispersant polymer of '008.

Differential Scanning Calorimetric Test (DSC)

The DSC test measures the ability of a lubricant to resist oxidation. The test was run at an isothermal temperature of 220° C. in pure oxygen at a pressure of 100 psi. The test measures the time (in minutes) to onset of oxidation of the lubricating oil.

A DSC test was performed on a low phosphorous (0.04 wt %) fully formulated 5W-30 oil containing 0.63 wt % the multiple function polymer of Examples 1 and 3 (75 ppm of the Mo compound) and comparative samples with a dispersant VII polymer only and a blend of dispersant VII polymer with an aminic antioxidant (CIBA L-67) at a treat rate of 0.50%. The results of the DSC are shown in Table 2 and demonstrate that the oils with the molybdenum compound of Examples 1 and 3 have better oxidative stability than a blend of a dispersant VII polymer with the CIBA anti-oxidant.

TABLE 2

DSC Data

| | Sample 1 | Sample 2 | Sample 3 | Sample 4 |
|---|---|---|---|---|
| Test Blend | Low P 0.04 wt % 5W-30 | Low P 0.04 wt % 5W-30 | Low P 0.04 wt % 5W-30 | Low P 0.04 wt % 5W-30 |
| Additive | Dispersant viscosity index improver of the '008 Patent | Dispersant viscosity index improver of the '008 Patent with CIBA L-67 | Multiple function polymer of Example 1 of the present invention | Multiple function polymer of Example 3 of the present invention |
| Treat Rate | 0.50 wt % | 0.50 wt % | 0.50 wt % | 0.50 wt % |
| Minutes to onset of Oxidation | 19.04 | 22.87 | 23.79 | 23.66 |

TEOST 33C ASTM D-6335

The TEOST 33C test measures the amount of deposits (in mg) formed by automotive engine oils utilizing the thermo-oxidation engine oil simulation test (TEOST). The test was conducted in accordance with TEOST 33 ASTM D-6335 on fully formulated lubricating oil containing the multiple function polymer of Example 1 and a comparative example containing the dispersant viscosity index improver of the '008 patent without the molybdenum compound. The results of the TEOST test are found in Table 3.

TABLE 3

| | Sample 1 | Sample 2 |
|---|---|---|
| Test Blend | Low P 0.04 wt % 5W-30 | Low P 0.04 wt % 5W-30 |
| Additive | Dispersant viscosity index improver of the '008 Patent | Multiple function polymer of Example 1 of the present invention |
| Treat Rate | .63 wt % | .63 wt % |
| Deposits, mg | 7.8 mg | 3.9 mg |

I claim:
1. A multiple function graft polymer comprising:
a. a polyolefin,
b. a nitrogenous, ethylenically unsaturated, aliphatic or aromatic monomer having from 2 to about 50 carbon atoms grafted onto said polyolefin; and
c. an organo-metallic compound reacted with said grafted monomer.
2. The multiple function polymer of claim 1, wherein said organo-metallic compound comprises a metallic member selected from the group consisting of molybdenum, cobalt, titanium, calcium, magnesium, manganese, bismuth, tungsten, and copper.
3. The multiple function polymer of claim 1 wherein said organo-metallic compound comprises a metal carboxylate containing a metallic component selected from the group consisting of molybdenum, cobalt, titanium, calcium, magnesium, manganese, bismuth, tungsten, and copper.
4. The multiple function polymer of claim 2, wherein said organo-metallic compound comprises a molybdenum compound.
5. The multiple function polymer of claim 3, wherein said metal carboxylate comprises a molybdenum carboxylate.
6. The multiple function polymer of claim 4, wherein said molybdenum compound is selected from the group consisting of: molybdenum boro neodecanoate, molybdenum 2-ethylhexanoate 4-nonyloxybenzoate, molybdenum (isosterate)

(4-nonyloxybenzoate), molybdenum dodecylbenzenesulfonate, molybdenum $C_{18}$ branched-linear carboxylate, molybdenum $C_{36}$ linear carboxylate, molybdenum $C_{36}$+-$C_{18}$ branched-linear carboxylate, molybdenum $C_{36}$ branched-linear carboxylate, molybdenum $C_{36}$/$C_{36}$+ linear carboxylate, molybdenum $C_{38}$+ branched alkyl carboxylate/t-butyl benzoate, molybdenum $C_{18}$ branched alkyl carboxylate/t-butyl benzoate, molybdenum oleate, molybdenum $C_{18}$ linear alkyl carboxylate/t-butyl benzoate, molybdenum octoate, molybdenum acetylacetonate, and combinations thereof.

7. The multiple function polymer of claim 4, wherein said molybdenum compound comprises molybdenum acetylacetonate.

8. The multiple function polymer of claim 4, wherein said molybdenum compound comprises molybdenum octoate.

9. The multiple function polymer of claim 4, wherein said molybdenum compound comprises molybdenum boro neodecanoate.

10. The multiple function polymer of claim 1, wherein said monomer is selected from the group consisting of 1-vinylimidazole, 1-vinyl-2-pyrrolidinone, N-allylimidazole, 1-vinylpyrrolidinone, 2-vinylpyridine, 4-vinylpyridine, N-methyl-N-vinylacetamide, diallyl formamide, N-methyl-N-allyl formamide, N-ethyl-N-allyl formamide, N-cyclohexyl-N-allyl formamide, 4-methyl-5-vinyl thiazole; N-allyl diisooctyl phenothiazine; 2-methyl-1-vinylimidazole, 3-methyl-1-vinylpyrazole, N-vinylpurine, N-vinylpiperazines, vinylpiperidines, vinylmorpholines, and combinations thereof.

11. The multiple function polymer of claim 1, wherein said monomer comprises 1-vinylimidazole.

12. The multiple function polymer of claim 1, wherein said polyolefin comprises a weight average molecular weight from about 20,000 to about 500,000, and a polydispersity of from about 1 to about 15.

13. The multiple function polymer of claim 1, wherein the ratio of said monomer to polymer is from about 8 to about 16 moles of monomer to one mole of polymer.

14. The multiple function polymer of claim 1, wherein the ratio of said molybdenum based compound to polymer is from about 2 to about 5 moles of molybdenum based compound to one mole of polymer.

15. A multiple function graft polymer comprising:
a. a polyolefin having a weight average molecular weight from about 20,000 to about 500,000 and a polydispersity of from about 1 to about 15,
b. a nitrogenous, ethylenically unsaturated, aliphatic or aromatic monomer having from 2 to about 50 carbon atoms, selected from the group consisting of 1-vinylimidazole, 1-vinyl-2-pyrrolidinone, N-allylimidazole, 1-vinylpyrrolidinone, 2-vinylpyridine, 4-vinylpyridine, N-methyl-N-vinylacetamide, diallyl formamide, N-methyl-N-allyl formamide, N-ethyl-N-allyl formamide, N-cyclohexyl-N-allyl formamide, 4-methyl-5-vinyl thiazole; N-allyl diisooctyl phenothiazine; 2-methyl-1-vinylimidazole, 3-methyl-1-vinylpyrazole, N-vinylpurine, N-vinylpiperazines, vinylpiperidines, vinylmorpholines, and combinations thereof grafted onto said polyolefin; and
c. an organo-metallic compound reacted with said monomer said compound selected from the group consisting of molybdenum boro neodecanoate, molybdenum 2-ethyl hexanoate 4-nonyloxybenzoate, molybdenum (isosterate) (4-nonyloxybenzoate), molybdenum odecylbenzenesulfonate, molybdenum $C_{18}$ branched-linear carboxylate, molybdenum $C_{36}$ linear carboxylate, molybdenum $C_{36}$+-$C_{18}$ branched-linear carboxylate, molybdenum $C_{36}$ branched-linear carboxylate, molybdenum $C_{36}$/$C_{36}$+ linear carboxylate, molybdenum $C_{36}$+ branched alkyl carboxylate/t-butyl benzoate, molybdenum $C_{18}$ branched alkyl carboxylate/t-butyl benzoate, molybdenum oleate, molybdenum $C_{18}$ linear alkyl carboxylate/t-butyl benzoate, molybdenum octoate, molybdenum acetylacetonate, and combinations thereof.

16. A multiple function graft polymer comprising a molybdenum compound selected from the group consisting of molybdenum boro neodecanoate, molybdenum octoate, molybdenum acetylacetonate, and combinations thereof reacted with a graft reaction product of a nitrogenous, ethylenically unsaturated, aliphatic or aromatic monomer having from 2 to about 50 carbon atoms grafted on a polyolefin, said graft reaction product having a weight average molecular weight of from about 20,000 to about 500,000 and a molar proportion of grafted monomer to the polyolefin of at least about 13:1.

17. A lubricating oil comprising:
a. a lubricant base oil;
b. at least about 0.1 wt % by composition weight of the multiple function polymer of claim 1; and
c. from 0% to about 4% by composition weight of other dispersants.

18. A lubricating oil comprising:
a. a lubricant base oil;
b. at least about 0.1 wt % by composition weight of the multiple function polymer of claim 15; and
c. from 0% to about 4% by composition weight of other dispersants.

19. A lubricating oil comprising:
a. a lubricant base oil;
b. at least about 0.1 wt % by composition weight of the multiple function polymer of claim 16; and
c. from 0% to about 4% by composition weight of other dispersants.

20. The multiple function polymer of claim 3, wherein the organo-metallic compound comprises a metal carboxylate having at least one $C_6$ to $C_{40}$ carboxylate moiety.

21. The multiple function polymer of claim 5, wherein the molybdenum carboxylate has at least one $C_6$ to $C_{40}$ carboxylate moiety.

* * * * *